(12) United States Patent
Law et al.

(10) Patent No.: US 8,580,170 B2
(45) Date of Patent: Nov. 12, 2013

(54) PROCESS FOR PRODUCING A SUBSTANTIALLY SHELL-SHAPED COMPONENT

(75) Inventors: Barnaby Law, Weyhe (DE); Kai Schumacher, Fredenbeck (DE); Jonathon Komadina, Sunbury (AU); Jochen Mueller, Bremen (DE); Norbert Heltsch, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1091 days.

(21) Appl. No.: 11/922,940

(22) PCT Filed: Jun. 30, 2006

(86) PCT No.: PCT/EP2006/006384
§ 371 (c)(1),
(2), (4) Date: Feb. 21, 2008

(87) PCT Pub. No.: WO2007/003372
PCT Pub. Date: Jan. 11, 2007

(65) Prior Publication Data
US 2009/0115088 A1     May 7, 2009

(30) Foreign Application Priority Data
Jun. 30, 2005   (DE) .................. 10 2005 030 939

(51) Int. Cl.
*B29C 47/76*     (2006.01)
(52) U.S. Cl.
USPC .............................. 264/101; 264/571; 156/82
(58) Field of Classification Search
USPC .................................... 264/101, 571; 156/82
See application file for complete search history.

(56) References Cited

U.S. PATENT DOCUMENTS

| 4,813,202 A | 3/1989 | Anderson |
| 5,242,523 A | * 9/1993 | Willden et al. ............... 156/285 |

(Continued)

FOREIGN PATENT DOCUMENTS

| EP | 1149687 | 4/2001 |
| EP | 1149687 | 10/2001 |

(Continued)

OTHER PUBLICATIONS http://www.compositesworld.com/glossary/D retreived Feb. 23, 2011.*

(Continued)

*Primary Examiner* — Yogendra Gupta
*Assistant Examiner* — John Robitaille
(74) *Attorney, Agent, or Firm* — Greer, Burns & Crain Ltd.

(57) ABSTRACT

Disclosed is a process for producing a substantially shell-shaped component, from substantially carbon-fiber-reinforced synthetic material having at least one local reinforcing zone and at least one stiffening element, in particular a fuselage shell, a wing shell, a vertical stabilizer shell or horizontal stabilizer shell of an aircraft or the like. The process according to the invention comprises the following steps:
 arranging at least one doubler which has already been cured, on an at most partially cured shell skin to form the local reinforcing zone,
 applying at least one stiffening element which has already been cured, and
 placing at least one at most partially cured connecting angle bracket against the at least one stiffening element at least in the region of the at least one doubler, and
 curing the shell skin and the connecting angle bracket.

7 Claims, 1 Drawing Sheet

(56) References Cited

U.S. PATENT DOCUMENTS

| | | |
|---|---|---|
| 5,454,693 A | 10/1995 | Aubry et al. |
| 6,374,570 B1 | 4/2002 | McKague, Jr. |
| 2001/0035251 A1* | 11/2001 | Matsui .................. 156/82 |
| 2004/0065409 A1 | 4/2004 | Lindsay et al. |
| 2005/0112394 A1 | 5/2005 | Pham et al. |

FOREIGN PATENT DOCUMENTS

| | | |
|---|---|---|
| GB | 884920 | 7/1958 |
| JP | 58316 | 1/1993 |
| JP | 310798 | 6/2001 |
| RU | 2113379 | 6/1998 |
| RU | 2230406 | 6/2004 |

OTHER PUBLICATIONS

Federal Service for IP report, Feb. 4, 2010, in Corresponding Russian Application.

Chinese Office Action, Oct. 9, 2009, in Corresponding Chinese Application.

Japanese Office Action, in Corresponding Japanese Application, Jul. 23, 2012.

* cited by examiner

PROCESS FOR PRODUCING A SUBSTANTIALLY SHELL-SHAPED COMPONENT

FIELD OF THE INVENTION

The invention relates to a process for producing a substantially shell-shaped component substantially from carbon-fiber-reinforced synthetic material, having at least one local reinforcing zone and at least one stiffening element. In particular, the invention relates to a process for producing a fuselage shell, a wing shell, a vertical or horizontal stabilizer shell of an aircraft or the like.

However, the invention can in principle be used to produce components of any desired shape in a fiber composite structure, which have at least one reinforcing element and require at least one local reinforcing zone for local load introduction regions.

BACKGROUND OF THE INVENTION

It is known for shell-shaped components that have been stiffened by stiffening elements to be partially provided with local thickened portions (referred to below as doublers), in order to absorb high load concentrations in individual portions of the component structure and to distribute these loads throughout the structure. In this context, a distinction is drawn between internal and external doublers.

Internal doublers are applied to the inner side, for example of a component provided with stiffening elements, and therefore have no influence on the outer contour of the component. In this case, the stiffening elements have to run over the doubler, i.e. the doubler and the stiffening components are arranged above one another.

However, in terms of technical implementation, it is only possible to run over a doubler with considerable outlay. Although the stiffening elements can generally be produced with a moderate offset, integration represents a frequent cause of complications during manufacture.

As an alternative to internal doublers on the inner side, it is possible for the doubler to be placed on the outer side of the component. This has the advantage that the complex inner structure of the inner side (reinforcing elements, spar, ribs, etc.) is not adversely affected. However, the outer side no longer has the desired contour, which has an adverse effect on aerodynamics for example in the case of aircraft structures.

Furthermore, the use of external doublers involves a number of manufacturing drawbacks. If the doubler is to be integrated in the manufacturing means, any change to the doubler entails a corresponding adjustment to the manufacturing means.

SUMMARY OF THE INVENTION

It is an object of the invention to provide a process which simplifies the production of a substantially shell-shaped component having at least one local reinforcing zone which is built up towards the inside (towards the stringer side) and at least one stiffening element, and in which the drawbacks known from the prior art do not occur.

This object is achieved by a process for producing a substantially shell-shaped component from substantially carbon-fiber-reinforced synthetic material having at least one local reinforcing zone and at least one stiffening element, which comprises the following steps:

arranging at least one doubler, which has already been cured, on an at most partially cured (i.e. non-cured or partially cured) shell skin to form a local reinforcing zone, applying at least one stiffening element which has already been cured, and placing at least one at most partially cured connecting angle against the at least one stiffening element at least in the region of the at least one doubler, and curing the shell skin and the connecting angle bracket.

The cured doublers, which have already been finish-machined, are positioned on the uncured shell skin or the skin laminate at the locations at which a doubler is required for reinforcement. The doubler can in this case be produced in a manufacturing process and material which differ from the skin laminate and then be applied to the shell skin. This is followed by cured stiffening elements or stringers and uncured connecting angle brackets, which are ductile and elastic in this state. The final step is the curing in order to complete a substantially shell-shaped component which is provided with a stiffening element and a reinforcing zone.

This process has numerous advantages:

Manufacture of a complex, large-size shell-shaped component in one curing cycle

Good mechanical properties of the shell-shaped component

High flexibility with regard to the doubler geometry, any load changes (influences the doubler size without affecting the tooling geometry for the shell and stringers) and ramp angle, etc.

The doubler is manufactured separately, with the result that the process of laying the shell skin is not slowed down by small thickened portions.

The cured doubler can be manufactured and/or machined within very narrow tolerances, reducing the thickness tolerance of the regions with a higher material thickness to the thickness tolerance of the shell skin or the skin laminate.

The separately manufactured doubler can be prefabricated using virtually any desired combinations of materials and laminate structures and can be separately machined and tested prior to installation. This allows the manufacturing risk involved in the overall shell-shaped component to be reduced in particular in the case of large wall thicknesses.

In the region of the at least one doubler, the at least one stiffening element may be matched to the contour of the at least one doubler before being applied to the shell skin. For this purpose, the stiffening element can, for example, be provided with a recess which serves to receive the doubler. The matching of the contour can be effected by machining, such as for example milling, grinding, laser cutting or the like.

The stiffening elements can in principle be of any suitable shape. In one particular embodiment, the stiffening elements are formed using reinforcing profiled sections, in particular T-profiled sections, double T-profiled sections, L-profiled sections, Z-profiled sections, rectangular profiled sections or the like, so that the stability is particularly high and the reinforcing elements can be manufactured at low cost by extrusion etc. as material made by the meter, with the extrudates being cut to length as required.

In accordance with a further embodiment, the shell skin, the at least one stiffening element, the at least one doubler and/or the at least one connecting angle bracket are formed using a fiber-reinforced synthetic material, in particular using a material that has a carbon-fiber reinforcement preimpregnated with a curable epoxy resin. The use of this so-called prepreg material, which is a carbon-fiber-reinforced sheet-like structure impregnated with a curable epoxy resin, simplifies production and reduces the time required.

In principle the curing of the shell skin and of the at least one connecting angle bracket can take place at room temperature and under atmospheric pressure. However, to improve and accelerate the curing, it is preferable that the curing of the shell skin and of the at least one connection angle bracket to produce the finished shell-shaped component takes place under pressure and the action of temperature, in particular in an autoclave or the like. This takes place, for example, at a temperature between 120° C. and 220° C. and at a pressure of up to 10 bar.

The invention also emcompasses a substantially shell-shaped component having at least one local reinforcing zone and having at least one stiffening element produced by the process according to the invention.

BRIEF DESCRIPTION OF THE DRAWINGS

The invention will now be explained with reference to a drawing, in which.

DETAILED DESCRIPTION OF THE INVENTION

Figure 1:
FIG. 1 shows a first step of the production process.
Figure 2:
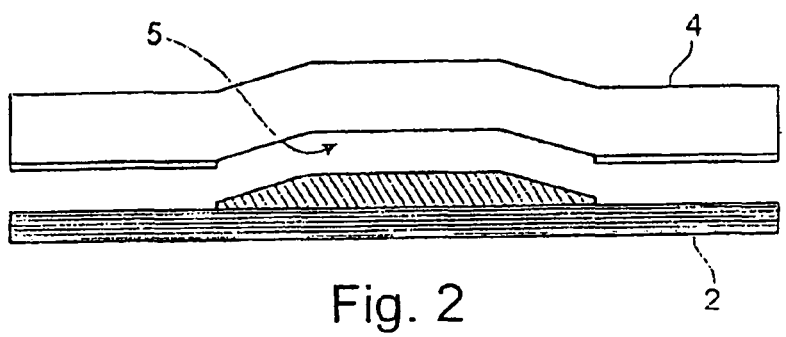
FIG. 2 shows a second step of the production process.
Figure 3:
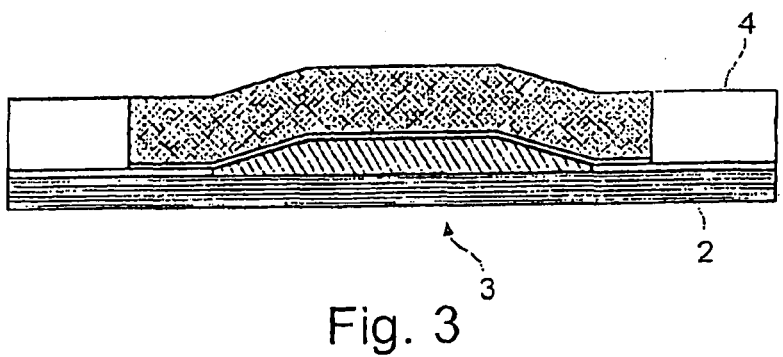
FIG. 3 shows a third step of the production process.

Reference is made to FIG. 1 to 3.

The figures illustrate the production of a shell-shaped component which is provided with a stiffening element formed as a stringer 4, wherein a thickening configured as a doubler 1 is formed in a reinforcing zone 3 to improve the introduction of load. In this case, semi-finished products, known as prepreg material, are used. The prepreg material is a carbon-fiber-reinforced sheet-like structure impregnated with a curable epoxy resin. Alternatively, it is also possible to use curable polyester or BMI resin systems for prepreg materials.

First of all, the shell skin 2 is laid in an uncured state, for example using the known "ATL" ("automated tape laying") process. The ATL process is a process for the automated production of laminates, in which unidirectional laid fiber fabrics, for example comprising carbon fibers or the like, are laid.

The cured and finish-machined doubler 1 is positioned on the uncured shell skin 3 at the locations at which the reinforcing zones 3 are to be formed. In this case, the doubler 1 can be used with other materials, laminate structures and manufacturing processes.

In the next step, the cured stringer 4 is positioned on the shell skin 3. The stringer 4 as stiffening element is provided with a recess 5, which has been produced by machining, for example by milling, grinding, laser cutting or the like. The recess 5 is arranged and formed in such a manner that it lies at the location at which the stringer 4 runs over the doubler 2 and receives the latter. Instead of the raised section which follows the recess 5 and is not provided with a reference numeral, the stringer 4 may also have a greater material thickness in the region of the doubler 1, in order to achieve the required mechanical strength in this region.

Therefore, the stringer 4 can be adapted without problems to virtually any contour of the doubler 1 and can also be laid in a shell.

Then, in the next step, an uncured laminate, which may already have been precompacted as an L-profiled section and substantially serves as a connecting angle bracket 6 or linking angle bracket, is laid over a base section of the stringer 4 and over the doubler 1. This L-profiled section is supported by a web of the stringer 4 which has already been cured.

Therefore, no further supporting tool is required for the curing step, thereby considerably simplifying manufacture. The structure which has been described is packaged in a conventional vacuum bag and cured. This takes place in an autoclave at a temperature between 120° C. and 180° C. and at a pressure of up to 10 bar.

What is claimed is:

1. A process for producing a substantially shell-shaped component from fiber-reinforced synthetic material having at least one local reinforcing zone and at least one stiffening element, the process comprising the steps of:
    arranging at least one doubler made of a fiber-reinforced synthetic material which has already been fully cured, on a shell skin made of a fiber-reinforced synthetic material being at most partially cured to form a local reinforcing zone,
    applying at least one stiffening element made of a fiber-reinforced synthetic material which has already been fully cured, the at least one stiffening element having a recess receiving the at least one doubler, and
    placing at least one connecting angle bracket made of a fiber-reinforced synthetic material being at most partially cured against the at least one stiffening element at least in the region of the at least one doubler,
    introducing a structure constituted by the shell skin, the at least one doubler, the at least one stiffening element and the at least one connecting angle bracket into a vacuum bag, which is moved into an autoclave for curing, and
    curing the shell skin and the connecting angle bracket at a temperature of between 120° C. and 180° C. and a pressure of up to 10 bar in the autoclave to produce a finished shell-shaped component, wherein the at least one connecting angle bracket is bonded to the at least one stiffening element and to the at least one doubler.

2. The process according to claim 1,
    wherein the at least one stiffening element, in the region of the at least one doubler, is matched to the contour of the at least one doubler before being applied to the shell skin.

3. The process according to claim 1,
    wherein the stiffening elements are formed using reinforcing profiled sections, in particular T-profiled sections.

4. The process according to claim 1,
    wherein the shell skin, the at least one stiffening element, the at least one doubler and/or the at least one connecting angle bracket are substantially formed using a material that has a carbon fiber reinforcement preimpregnated with a curable epoxy resin.

5. The process according to claim 1,
    wherein the substantially shell-shaped component is a fuselage shell, a wing shell, a vertical or horizontal stabilizer shell of an aircraft.

6. A shell-shaped component having at least one local reinforcing zone and at least one stiffening element produced in accordance with claim 1.

7. The shell-shaped component according to claim 6, wherein the shell-shaped component is one of a fuselage shell, a wing shell, a vertical or a horizontal stabilizer shell of an aircraft.

* * * * *